United States Patent [19]

May et al.

[11] 4,431,870
[45] Feb. 14, 1984

[54] TELEPHONE SYSTEM WITH COMPUTER GENERATED DIAL PAD AND AUTOMATIC DIALING

[76] Inventors: George A. May, R.R. 1, E. Sooke Rd., Sooke, British Columbia, Canada, V0S 1N0; Henry A. Strobel, 27 Kristy Ct., Novato, Calif. 94947

[21] Appl. No.: 352,167

[22] Filed: Feb. 25, 1982

[51] Int. Cl.³ ............................................. H04M 1/23
[52] U.S. Cl. .............................. 179/81 C; 179/90 BB; 179/90 B; 340/707; 340/712; 340/286 M
[58] Field of Search ................ 179/1 VL, 2 A, 2 DP, 179/5 R, 81 C, 84 L, 90 B, 90 BB, 90 BD, 99 LS, 2 TV, 90 AD; 340/712, 707, 286 M; 178/87, 18, 19, 20, 17 C, 17 D

[56] References Cited

U.S. PATENT DOCUMENTS

| | | |
|---|---|---|
| 3,587,053 | 6/1971 | Horzepa . |
| 3,670,322 | 6/1972 | Mallebrein . |
| 3,707,715 | 12/1972 | Peratto ............................ 340/748 X |
| 3,735,395 | 5/1973 | Iwabuchi et al. . |
| 3,877,018 | 4/1975 | Hakozaki ............................ 340/707 |
| 3,879,722 | 4/1975 | Knowlton . |
| 4,121,204 | 10/1978 | Welch et al. . |
| 4,150,254 | 4/1979 | Schossler ........................ 179/2 TV |
| 4,185,282 | 1/1980 | Pick ................................... 340/711 |
| 4,190,833 | 2/1980 | Bejting et al. ..................... 340/707 |

OTHER PUBLICATIONS

Martin, "Design of Man-Computer Dialogues", IBM Systems Research Institute, 1978.
Higginbotham, "Teleconference System", IBM Technical Bulletin, vol. 22, No. 9, pp. 3923-3925, Feb. 1980.

Primary Examiner—G. Z. Rubinson
Assistant Examiner—James L. Dwyer
Attorney, Agent, or Firm—Majestic, Gallagher, Parsons & Siebert

[57] ABSTRACT

A computer input/output device is disclosed for performing the functions of a telephone. More particularly, an input/output device is disclosed particularly adapted for use with computer communication equipment. The subject device includes a video display connected to a central processor. The central processor is capable of generating and supplying video output to the display. The video output includes the representation of telephone keys. The central processor is also capable of generating output tones respectively corresponding to the telephone keys. An interactive light pen is provided for receiving optical input from the video display and supplying an electrical output to the cental processor. In use, the light pen is placed over the image of particular telephone keys whereby the central procesor will generate an output tone corresponding to that key. In the preferred embodiment of the subject invention, an automatic dial directory is provided to permit the rapid dialing of frequently called numbers. In addition, a nonmechanical volume control is disclosed.

12 Claims, 3 Drawing Figures

TELEPHONE SYSTEM WITH COMPUTER GENERATED DIAL PAD AND AUTOMATIC DIALING

BACKGROUND OF THE INVENTION

The subject invention relates to a new and improved input/output device for performing the functions of a telephone. More particularly, a telephone device is disclosed having computer generated soft keys and an automatic dialing function.

Most telephones in use today perform the dialing function either via a rotary dial or the so called Touch Tone keys. A rotary dial functions to generate a stream of interrupts or pulses, the number of which correspond to the number dialed. In contrast, the depressing of keys on a Touch Tone phone causes audio signals of various pitches to be generated. As can be appreciated, both of the above described telephones require mechanical contact switches. It is an object of the subject invention to provide a new and improved telephone which eliminates the use of any mechanical switches.

In the prior art, a variety of interactive input/output devices have been developed. For example, in U.S. Pat. No. 4,190,833, issued Feb. 26, 1980 to Bejting, et al., an alphanumeric text generator is disclosed which includes a video display and interactive light pen. In the latter system, the light pen is used to select alphanumeric characters from the display array on the video screen. The characters are then processed and redisplayed on another portion of the screen. The latter system is intended to permit communication between an individual and a computer. Frequently, such interactive communications are carried over telephone lines. Thus, it would be desirable to provide an input/output device particularly adapted for use with computer communications which includes the functions of a telephone.

SUMMARY OF THE INVENTION

Accordingly, it is an object of the subject invention to provide a new and improved input/output device which performs the functions of a telephone without utilizing mechanical switches.

It is another object of the subject invention to provide a new and improved input/output device which may be conveniently adapted for use in electronic communications.

It is a further object of the subject invention to provide a new and improved input/output device which functions as a telephone and includes an automatic dialing feature.

It is still another object of the subject invention to provide a new and improved input/output device having the functions of a telephone and which includes a non-mechanical volume control.

In accordance with these and many other objects, the subject invention provides a computer input/output device for performing the functions of a telephone. More particularly, the subject device includes a display means, such as a cathode ray tube. The display means is connected to a central processor for controlling the information supplied to the display. The central processor is provided with a means for generating a visual output. A portion of the visual output includes the representation of telephone keys. The fixed visual information is stored in a read only memory (ROM) in the central processor. The central processor is also provided with a means for generating tones and/or dial pulses, respectively corresponding to the keys of a telephone. Preferably, the tone or dial pulse generater is a digital device.

The subject invention further includes a detector means such as light pen, operatively connected to the central processor, and capable of receiving optical input from the display means and supplying an electrical output to the central processor. The light pen is movable over the video display such that when the light pen is placed over the image of a particular telephone key, the central processor generates an output tone or dial pulses corresponding to that key. By this arrangement, the dialing function can be achieved without the use of mechanical switches.

In the preferred embodiment of the subject invention, the visual output further includes an automatic dial directory which can be programmed with emergency or frequently called numbers. By this arrangement, when the light pen is used to select a telephone number from the directory, the central processor will generate tones corresponding to the digits of the telephone number which was chosen. The visual output will also include an alphanumeric array to enable the directory to be programmed. In use, the light pen is aligned with characters in the array, with the selected characters being supplied to and displayed in the directory.

The preferred embodiment of the subject invention further includes a non-mechanical volume control. More particularly, the video output will include a volume control block, defined by an elongated area on the display means. One end of the elongated area corresponds to low volume levels, while locations spaced increasingly distant from the low volume end, correspond to progressively higher volumes. The light pen is used to select a location within the elongated area. By this arrangement, the volume of the telephone signals received are amplified and adjusted in correspondence with the volume level associated with the selected location.

Further objects and advantages of the subject invention will become apparent from the following detailed description taken in conjunction with the drawings in which:

DESCRIPTION OF THE PREFERRED EMBODIMENT

Figure 1:
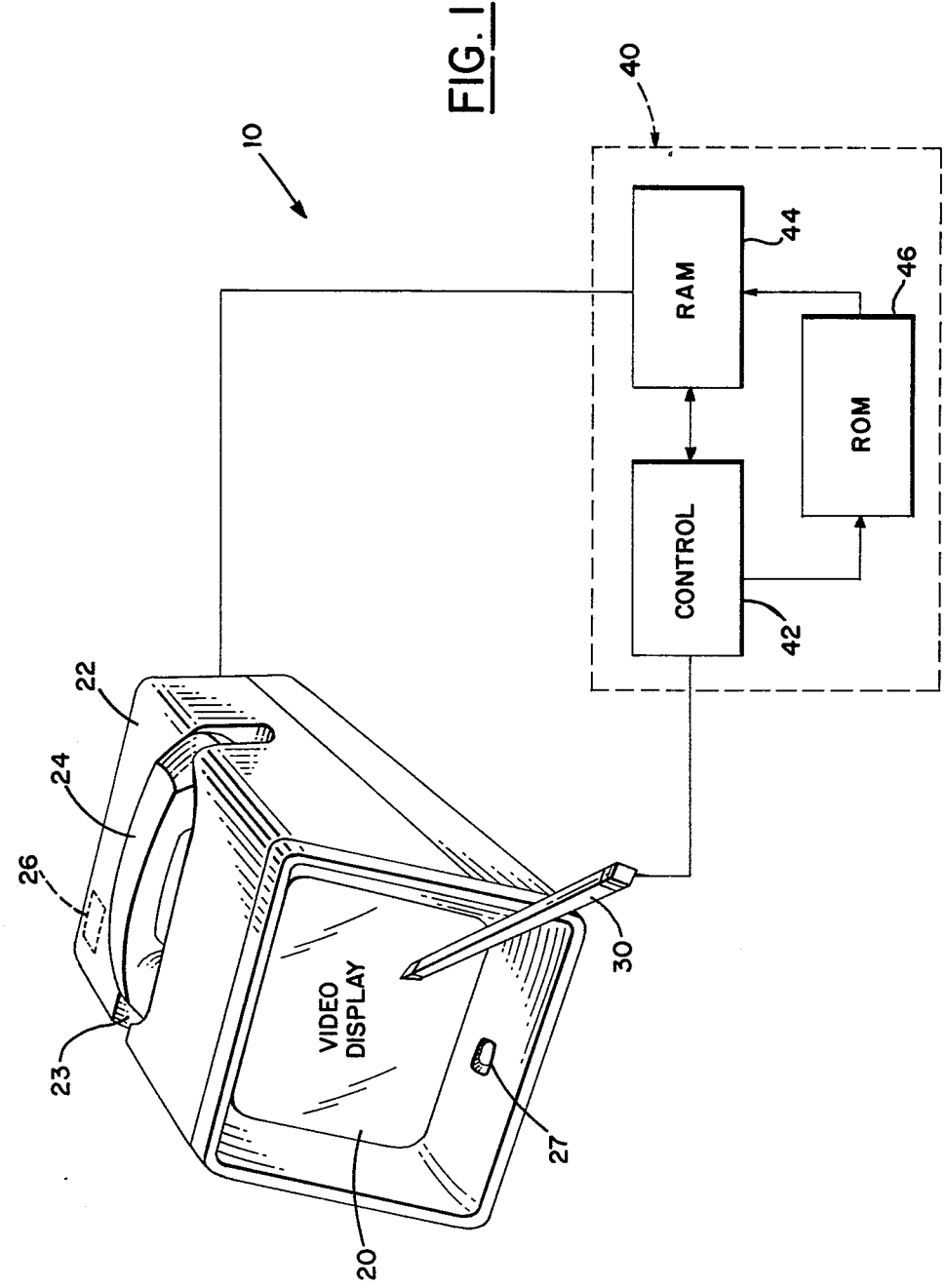
FIG. 1 is a partial block diagram illustrating the new and improved input/output device of the subject invention.

Referring to FIG. 1, there is illustrated a partial block diagram of the input/output device 10 of the subject invention. The input/output device 10 is intended to function as a telephone and is particularly suited for use in conjunction with electronic data communication. Accordingly, a connection (not shown) between the subject device 10 and a telephone line must be provided.

Device 10 includes a display means 20 consisting, for example, of a cathode ray tube monitor, which is mounted in a housing 22. A recessed area or cradle 23 may be formed in housing 22 for receiving a conventional telephone handset 24. Preferably, a speakerphone system is provided including a speaker 26 (shown in phantom), and a microphone 27, both mounted within the housing 22. As described below, the speakerphone system may be used as an alternate to the handset 24.

The subject input/output device 10 further includes a detector means such as light pen 30 adapted to be movable over the front surface of display means 20. Light pen 30 is operative to convert optical impulses received from the video display into an electrical output signal. A variety of light pens are known in the prior art and their operation need not be described. One form of light pen suitable for use with the subject invention is described in applicant's co-pending application Ser. No. 346,368, filed Feb. 5, 1982, entitled "High Resolution Light Pen For Use With Graphic Displays."

The output from light pen 30 is supplied to a central processing means 40. The electronics for central processing means 40 can be conveniently located within housing 22. Central processing means 40 includes a control means 42 and may be defined by a variety of central processing units presently available. For example, the Motorola 6800 Series CPU's are suitable to function as the control means 42. Control means 42 may also include a cathode ray tube controller to provide addressing for maintaining and refreshing the video image. The combination of a cathode ray tube controller and a central processing unit is well known in the art. However, in applicant's co-pending application Ser. No. 345,820, filed Feb. 4, 1982, entitled "Video Computing System With Automatically Refreshed Memory," a unique arrangement is disclosed suitable for use with the subject invention wherein a CPU and a cathode ray tube controller are combined in a manner which obviates the need to provide separate circuitry for refreshing the dynamic RAMS.

The central processing means 40 further includes a random access memory (RAM) 44, having a battery back-up. A portion of RAM 44 is used to store video information to be supplied to the display means 20. The video information is stored in the form of a bitmap wherein data defining the characteristics of each pixel on the display means 20 is stored in a matrix configuration. The storing of video data in a bitmap format is described in greater detail in applicant's co-pending application Ser. No. 345,820, cited above.

Central processing means 40 further includes a means for generating specific fixed video information to be supplied to display means 20. More particularly, a read only memory (ROM) 46 is provided which can be programmed with fixed video data. The contents of ROM 46 will described in detail below. While the drawing illustrates a single read only memory 46, it is contemplated that any number of ROM's can be interconnected and used to store the necessary video information.

Figure 2:
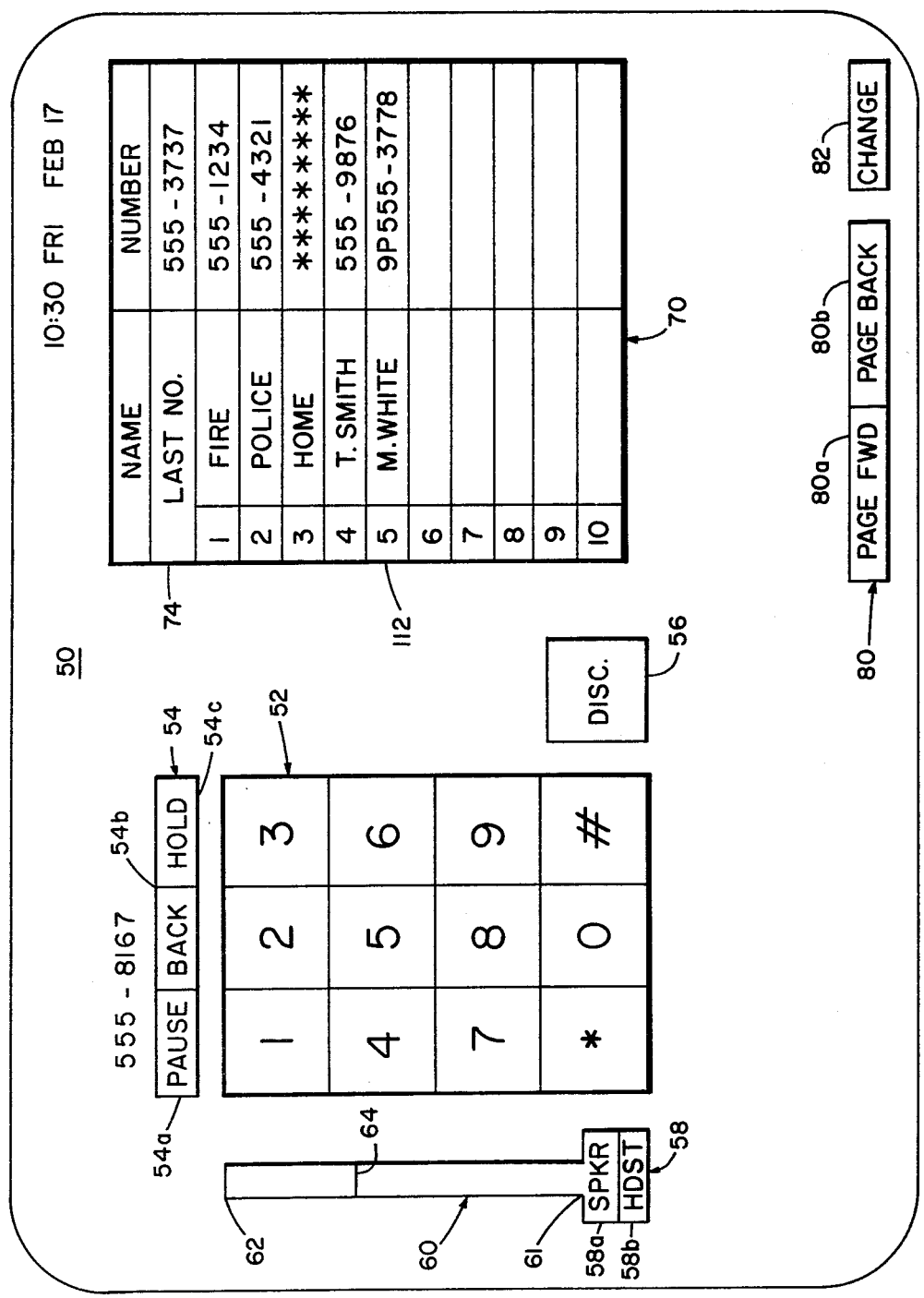
FIG. 2 is an illustration of a video display corresponding to the main telephone mode of the new and improved input/output device of the subject invention.

Referring now to FIG. 2, the main display mode 50 of the subject device 10 is illustrated. The majority of video information displayed in FIG. 2 is permanently stored and derived from ROM 46. In contrast a portion of the data, such as the telephone numbers displayed in the directory, are programmed by the user into random access memory (RAM) 44, as described more fully hereinbelow.

The phone mode display 50 includes a representation of the dialing elements of a Touch Tone dial pad 52. More particularly, areas are defined on the screen which correspond to the digits of the telephone keys. In brief, a user selects the particular digits to be dialed by placing the light pen over the selected representation of the key. The electronics of light pen 30 will be actuated by the scanning electron beam of display means 20. The reception of the radiation from the electron beam causes a strobe signal to be generated, which is supplied to control means 42 of the central processing means 40. The strobe signal is utilized to determine the X and Y coordinates of the light pen, relative to the display, at the time of the strobe signal. The operation of light pen circuitry, capable of generating an accurate strobe signal is described in detail, in applicant's co-pending application, Ser. No. 346,368, cited above.

Control means 42 then compares the X and Y location coordinates supplied by the light pen, to a table stored in ROM 46, and determines which dialing element has been selected. The above described steps for determining where the light pen has been placed and which dialing element has been selected are identical for all functions to be described hereinbelow. Once the control means has determined which area or control block has been selected, various associated operations are then carried out. For example, when digits are selected from the telephone keyboard, the central processing means functions to generate signal tones having frequencies respectively corresponding to the digits selected.

Display 50 includes a dialing assistance block 54, which is defined by areas labeled pause 54a, back 54b, and hold 54c. The pause function 54a is for use with telephone systems where a second dial tone is received when obtaining an outgoing line. The use of the pause block 54a will be described below in connection with the automatic dial directory. The back block 54b is used similarly to a back key on a typewriter and functions to correct any errors in dialing. Finally, the hold block 54c performs the function of a "hook-flash" which is utilized in some telephone systems for placing a party on hold. A disconnect block 56 is provided for breaking the telephone connection.

A speaker/headset control block 58 is provided and is displayed to the left of dial pad 52. Control block 58 consists of separate speaker and headset activation areas, 58a and 58b, respectively. To originate a call, the user either lifts handset 24 out of cradle 23 or activates the speakerphone system by aligning light pen 30 with block 58a. Either action will cause a dial tone to be received. In the alternative, if speakerphone system is not activated and handset 24 remains in its cradle, the user can predial the desired number using the dial pad 52. In either case, the digits being selected by the light pen are displayed above control block 54 as illustrated in FIG. 2. When the user has predialed the number, the lifting of the handset 24 or the selection of the speakerphone will cause the dial tone to be received and the predialed number to be transmitted.

A volume control block 60 is provided above and contiguous with control block 58. Volume control block 60 is used to regulate the output volume level of speaker 26. Volume control block 60 is defined by an elongated area with the lower end 61 thereof corresponding to a low volume level. Locations, spaced increasingly distant from low volume end 61 towards the upper end 62 thereof, correspond to increasingly higher volumes. In use, the operator places the light pen at any location within volume control block 60. The volume of the received telephone signals are amplified tor wishes to redial, he merely has to select the upper block 74 to output the number again.

In summary, there is provided a new and improved input/output device for performing the functions of a telephone. More particularly, the subject device 10 includes a display means 20 which is connected to a central processing means 40. The central processing means includes a control means 42 for generating and supplying visual output to display means 20. The fixed visual output is stored in a ROM 46 which includes a representation of telephone dialing elements. The central processing means 40 is capable of generating output tones or dial pulses respectively corresponding to the displayed telephone keys. The subject device 10 further includes a detector means such as light pen 30 which is connected to the central processing means 40 and is capable of receiving optical input from the display means and supplying an electrical output signal to the central processing means. The light pen is movable over the display means such that when the light pen is placed over the image of a particular dialing element, the central processing means generates an output tone corresponding to that key.

In the preferred embodiment of the subject invention, an automatic dial directory 70 is provided permitting the display of frequently called telephone numbers. The light pen can be used to select telephone numbers from the directory for automatic dialing. In the preferred embodiment, the visual output further includes an alphanumeric array 90 to permit the light pen to be used to program the numbers into the directory. The subject invention further includes a nonmechanical volume control means 60 defined by an elongated area on the display. One end of the volume control block corresponds to a low volume level, while locations spaced increasingly distant from the low volume end correspond to progressively higher volumes. By this arrangement, when the light pen is placed at a location within the elongated area, the volume of the received telephone signals to the device will be amplified and adjusted corresponding to the volume level associated with the selected location.

It is to be understood that while the subject invention has been described with reference to a preferred embodiment, various other changes and modifications could be made therein by one skilled in the art, without varying from the scope and spirit of the subject invention as defined by the appended claims.

We claim:

1. A computer input/output device for performing the functions of a telephone comprising:
   display means;
   central processing means connected to the display means, said central processing means for generating and supplying visual output to said display means, said visual output including an alphanumeric display of telephone dialing elements, said central processing means being capable of generating output information respectively corresponding to the dialing elements; and
   detector means operatively connected to said central processing means, said detector means for receiving optical input from the display means and supplying a signal to said central processing means, said detector means being movable over the display means such that when said detector means is placed over the image of a particular dialing element, said central processing means generates output information corresponding to that dialing element.

2. An input/output device as recited in claim 1 wherein said visual output further includes a volume control means, said volume control means being defined by an area on said display means wherein one end of said area corresponds to a low volume level and with locations spaced increasingly distant from said one end, towards the opposed end of said area, corresponding to progressively higher volumes, such that when said detector means is placed at a location within said area, the volume of the received telephone signals to said device will be amplified and adjusted in correspondence with to the volume level associated with that selected location.

3. An input/output device as recited in claim 1 wherein said visual output further includes a directory permitting the display of frequently called telephone numbers whereby said detector means can be used to select a telephone number from the directory causing said central processing means to generate output information corresponding to the digits of saidd telephone number.

4. An input/output device as recited in claim 3 wherein said visual output further includes an alphanumeric array such that said detector means can be used to select digits from said array for programming the telephone numbers into said directory.

5. An input/output device as recited in claim 4 further including a secrecy means for preventing the display of selected telephone numbers, such that when said directory is programmed with the selected telephone number, the digits of that number are not displayed.

6. An input/output device as recited in claim 3 wherein said directory consists of a plurality of pages and wherein said display further includes a control block for selecting which page is presently displayed and wherein said detector means is used to activate said control block for displaying the desired page.

7. An input/output device as recited in claim 3 wherein the said directory includes an area for displaying the most recently dialed number to facilitate the redialing of that number.

8. An input/output device as recited in claim 1 wherein said visual output includes a control block for inserting a timing pause in the dialing operation such that when a second dial tone is required for an outgoing line, said control block is selected to thereby insert a timing pause to permit the reception of the second dial tone.

9. An input/output device as recited in claim 1 wherein the fixed visual output display is stored in a read only memory within said central processing means.

10. An input/output device as recited in claim 1 wherein the programmed visual information displayed on the display means is stored in a random access memory within said central processing means.

11. An input/output device as recited in claim 1 wherein said detector means is defined by a light pen capable of receiving optical input from said display means and generating and supplying an electrical output to said central processing means.

12. A telephone dialing apparatus comprising:
    Display means having a generally planar surface responsive to signals applied thereto for generating visual displays thereon; and
    Means coupled to said display means for applying signals thereto for generating an alphanumeric representation of telephone dialing elements, said means being responsive to the selection of individual ones of said telephone dialing elements generated on said planar surface of said display means for providing output information used in generating telephone dial signals.

* * * * * and adjusted in correspondence with the volume level associated with the selected location. A marker line 64 is displayed within the block to indicate the selected volume level. A digitally controlled, output attenuator, for example, may be provided in the control means 42 for varying the volume levels.

The subject output device 10 further includes an automatic dial directory 70 for storing emergency and frequently called numbers. As illustrated in FIG. 2, directory 70 consists of a table having areas for the name of the party to be called and the corresponding telephone number. In addition, the upper most block 70 is intended to display the last number which has been dialed either from the directory or using dial pad 52. The illustrated directory 70 has space for ten telephone numbers. In the preferred embodiment of the subject invention, additional storage space is provided in RAM 44 for another twenty telephone numbers defined by two additional pages. Any page of the directory can be accessed by utilizing control block 80. More particularly, the selection of either the page forward 80*a* or the page back 80*b* blocks by the light pen will result in the desired directory page being displayed on the screen.

Figure 3:
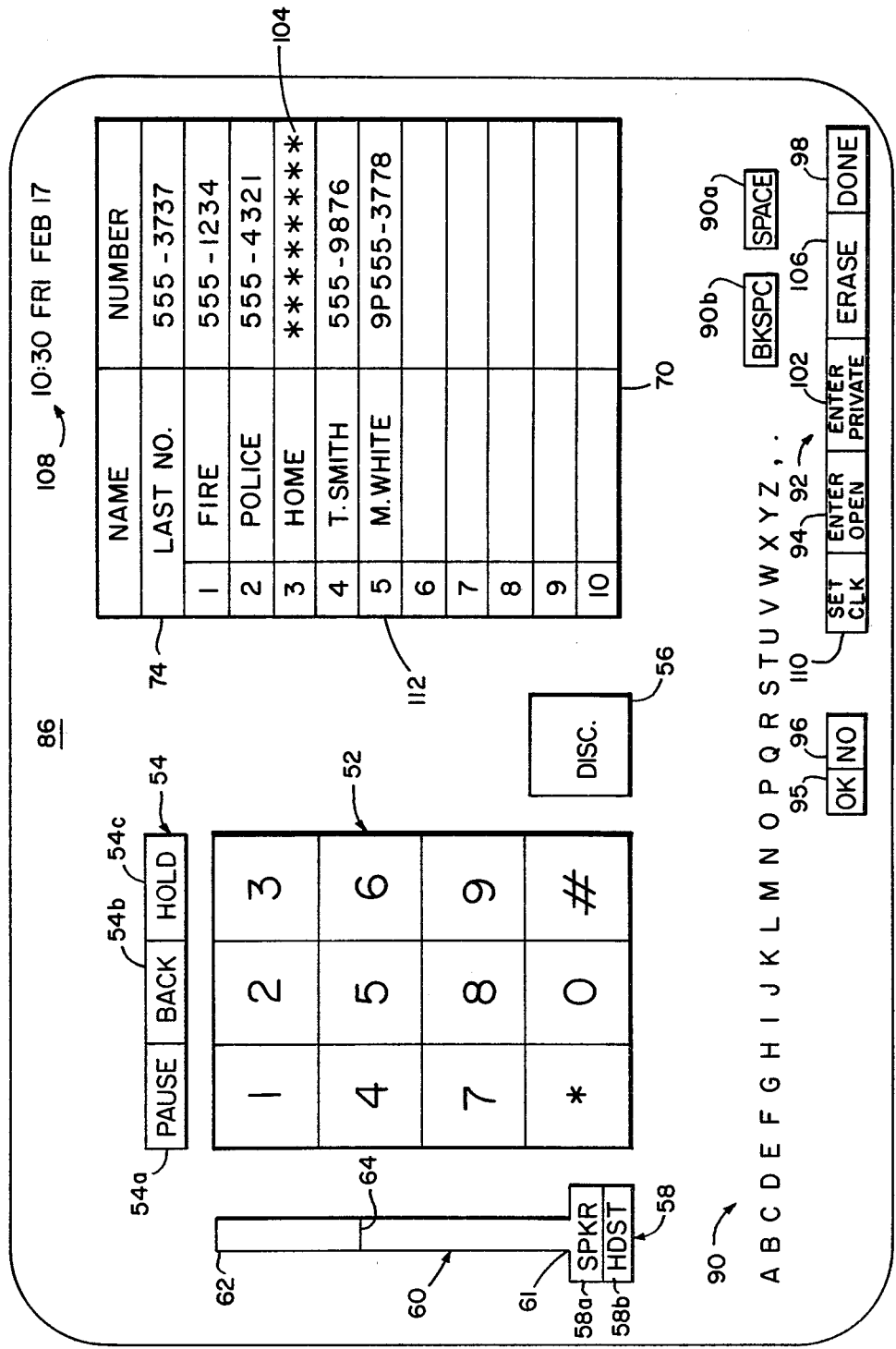
FIG. 3 is an illustration of the video display depicting a second display mode, used for programming the dial directory of the input/output device of the subject invention.

The format of the automatic dial directory 70 is stored in ROM 46. The information within the directory is programmed into RAM 44 by the operator. In order to program the directory, the operator must first switch to the second or input display mode 86 by placing light pen 30 on control block 82 labeled change. By selecting change block 82, the display 86, illustrated in FIG. 3 will be generated. Display 86 includes an array 90 of alphanumerics which are located along the lower portion of the screen. The letters forming the names in directory 70 are selected by the light pen from the array. The programming steps are initiated via control blocks 92, whose functions will be described in detail below.

In order to program a name and number into directory 70, the operator initially selects the enter open block 94, with light pen 30. Thereafter, light pen 30 is used to locate the position in the directory where the upcoming entry is to be placed. A cursor (not shown) is displayed in the directory at the point selected by the light pen. The operator then selects the letters from alphanumeric array 90 and selects the digits of the phone number from dial pad 52. The space and backspace blocks 90*a* and 90*b* are used as on a typewriter. When the programming sequence is accomplished, the user signifies satisfactory completion by aligning the light pen on control block 95, labeled "OK". The latter action causes the information to be stored in RAM 44. Control block 96, labeled "NO" is used to cancel the proposed addition. When either of control blocks 94 or 96 are activated, the display remains in the change display mode 86 and additional numbers may be programmed. In the alternative, by selecting control block 98, labeled "done", the most recent addition to the directory 70 will be stored and the display will return to the original phone mode display 50 as illustrated in FIG. 2. It is noted that while the use of a visual alphanumeric array 90 is illustrated, the subject device may also be provided with a separate keyboard for performing the above described data entry or for inputting text and other information.

In certain situations, the user would find it undesirable to display personal telephone numbers in the display. In this situation, the operator can initiate the programming of the telephone number by selecting control block 102, labeled "enter private". The actual programming of the name and telephone number is accomplished identically to the above described entry procedure. However, when the procedure is complete and the user stores the information by selecting one of the control blocks 94 or 98, the displayed telephone number will be replaced with asterisks, as illustrated in area 104 of the directory.

The removal of telephone numbers from the directory is initiated by by selecting control block 106, labeled "erase". When this mode is selected, the light pen is first placed at the beginning of the information to be erased, and then placed at the end of the information. The information which has been so delineated is erased from RAM 44.

In the preferred embodiment of the subject invention, a day-date clock 108 is provided, as illustrated in the upper right hand corner of the displays. The programming of the correct data and time is initiated by selecting control block 110, labeled "set clock". Similar to the programming of directory 70, the time, day and date are input using the visual keyboard array 90 and the dial pad 52.

Having described the elements of the input/output device 10 of the subject invention, its operation will now be described in detail. To originate a call, the user may either predial the phone number or dial the number after the dial tone has been established. To predial a telephone number, light pen 30 is used to select the digits of the desired telephone number. More particularly, light pen 30 is aligned with the areas on visual dial pad 52 in the desired sequence. The digits which are selected are displayed above control block 54, as illustrated in FIG. 2. If the particular telephone system utilizes a second dial tone to obtain an outside line, the pause block 54*a* is utilized to insert a tone sensing sequence or time delay in the dialing procedure. The use of the pause block is represented in the subject display by the letter "P", as illustrated for example, in the phone number located in position number five 112 of directory 70. Once the number has been pre-dialed, it will be transmitted when the operator either removes handset 24 from cradle 23 or selects the speakerphone system by actuating control block 58*a*. The central processing means 40 generates the signal tones or dial pulses corresponding to the digits which have been selected.

During the call, the received volume level supplied to speaker 26 can be adjusted by placing the light pen at the desired location within volume control block 60. As discussed above, the output is attenuated in correspondence with the position selected within block 60. When the telephone call is completed, the operator may either hang up handset 24 or select the disconnect control block 56 with light pen 30. If the disconnect block 56 is selected while handset 24 is off hook, a momentary break in the line will be produced, followed by the re-establishment of a dial tone.

When it is desired to utilize directory 70, the telephone is activated in the same manner as with regular dialing. Thereafter, the light pen is placed anywhere within the block of the directory corresponding to the number selected. That number is then automatically dialed and displayed above the control block 54. The last number dialed, either from directory 70 or from dial pad 52, is displayed in the uppermost block 74 of the directory. If the telephone called is busy and the opera-